United States Patent
Platow et al.

(10) Patent No.: US 7,413,596 B2
(45) Date of Patent: Aug. 19, 2008

(54) METHOD AND APPARATUS FOR THE PRODUCTION OF PURIFIED LIQUIDS AND VAPORS

(75) Inventors: Wilhelm P. Platow, Somerville, MA (US); John B. Cracchiolo, Gloucester, MA (US); Stanislav S. Todorov, Topsfield, MA (US); Jaime M. Reyes, Beverly, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 730 days.

(21) Appl. No.: 10/982,561

(22) Filed: Nov. 5, 2004

(65) Prior Publication Data

US 2007/0056316 A1    Mar. 15, 2007

(51) Int. Cl.
*C02F 1/22* (2006.01)
*B01D 19/00* (2006.01)

(52) U.S. Cl. ............. 95/266; 95/241; 96/201; 96/193; 250/492.21

(58) Field of Classification Search ........... 95/266, 95/241; 96/201, 193
See application file for complete search history.

(56) References Cited

U.S. PATENT DOCUMENTS

| | | | | |
|---|---|---|---|---|
| 208,304 | A * | 9/1878 | Gamgee | 62/67 |
| 828,887 | A * | 8/1906 | Hoofnagle | 62/75 |
| 4,022,592 | A * | 5/1977 | Saaski | 96/194 |
| 5,157,929 | A * | 10/1992 | Hotaling | 62/66 |
| 5,814,819 | A | 9/1998 | Sinclair et al. | |
| 6,248,642 | B1 | 6/2001 | Dolan et al. | |

OTHER PUBLICATIONS

"An Apparatus for Degassing Liquids by Vacuum Sublimation" by T. N. Bell et al.; Dec. 1968; The Journal of Physical Chemistry; vol. 72, No. 13; pp. 4693-4695.*

* cited by examiner

*Primary Examiner*—Duane Smith
*Assistant Examiner*—Douglas J Theisen (57) ABSTRACT

The present invention provides methods and apparatus for the production of liquids and vapors that are free of, or substantially free of, dissolved or trapped gases. In one embodiment, a liquid is placed in a sealed vessel and subjected to a temperature below the freezing point of the liquid for sufficient time to substantially, if not completely, turn the liquid into a solid. Concurrent with or subsequent to the cooling of the liquid, the interior of the vessel is subjected to a vacuum so as to evacuate all or substantially all of the gaseous atmosphere. Thereafter, the vessel is heated to a temperature above the melting point of the liquid, allowing the frozen material to return to its liquid form or sublimate to form a vapor.

33 Claims, 4 Drawing Sheets

METHOD AND APPARATUS FOR THE PRODUCTION OF PURIFIED LIQUIDS AND VAPORS

BACKGROUND OF THE INVENTION (1) Technical Field

The present invention relates generally to the production of purified liquids and vapors and more particularly to methods and apparatus for the separation of dissolved and/or trapped gasses from a liquid, as well as the production of high concentration vapors of the degassed liquid.

(2) Related Art

Liquids, whether occurring naturally or resulting from synthetic processes, oftentimes contain various constituents, in addition to the identified liquid material, as contaminants or by-products. Numerous methods are known for the extraction of many of these constituents. For example, appropriate reagents may be reacted with the constituents to form salts or other compounds that can then be removed by precipitation, centrifugation, filtering, etc. Similarly, sequestering agents may be used to sequester specific metal ions. Additionally, solvent extractions may be performed where the identified liquid is "washed" with an incompatible liquid that has a greater solubility or affinity for the constituent. Finally, the liquids may be subjected to simple filtering methods using filters, such as HEPA filters or activated carbon filters, having particular efficacy or affinity for the material to be removed.

While such methods will "purify" the liquid of many undesired constituents, oftentimes such liquids still retain dissolved or trapped gasses. The presence of such constituents is not always problematic. However, certain manufacturing processes require high purity materials. This is particularly true in the field of microelectronics, where many techniques or processes, such as chemical vapor deposition (CVD), molecular beam epitaxy (MBE), ion implantation, plasma etching, and gas mixing, use source materials that are liquids at room temperature and require heating to produce a vapor. Current vapor delivery systems utilize bubblers, vaporizers, high pressure nozzles etc., which are difficult to handle, have an initial delay (warm up and settling time), and require particular equipment modifications.

For example, U.S. Pat. No. 5,814,819 to Sinclair et al. teaches the use of water vapor in neutralizing an ion beam in an ion implanter. Ion implantation is particularly important in semiconductor/integrated circuit manufacture. Similarly, U.S. Pat. No. 6,248,642 to Dolan et al. teaches the use of a controlled water vapor for oxygen implantation in the production of silicon wafers. Traditionally, water vapor for these processes is generated by heating the water above its boiling point or by subjecting water to ultrasonic vibrations that create a fine mist of water. While both methods produce the desired water vapor, care must be taken to avoid condensation of the water on the materials being implanted or the equipment used in such processes. Such condensation may occur as a result of the low pressures (below atmospheric pressure) employed in carrying out ion implantation. Furthermore, neither of these methods of generating water vapor removes or prevents the presence of extraneous gases or constituents in the water vapor, both of which can adversely affect the performance of ion implantation processes, increasing the defect rate in the resultant products.

Thus, there exists a need for methods and apparatus for providing purified liquids free of, or substantially free of, dissolved and/or trapped gaseous constituents. There also exists a need for methods and apparatus for readily producing highly concentrated vapors of such purified liquids, especially at low pressures, i.e., below atmospheric pressure. Finally, there exists a need for simple methods and apparatus for forming a highly-saturated, purified, low pressure water vapor.

SUMMARY OF THE INVENTION

The present invention provides methods and apparatus for the production of liquids and vapors that are free of, or substantially free of, dissolved or trapped gases. In one embodiment, a liquid is placed in a sealed vessel and subjected to a temperature below the freezing point of the liquid for sufficient time to substantially, if not completely, turn the liquid into a solid. Concurrent with or subsequent to the cooling of the liquid, the interior of the vessel is subjected to a vacuum so as to evacuate all or substantially all of the gaseous atmosphere. Thereafter, the vessel is heated to a temperature above the melting point of the liquid, allowing the frozen material to return to its liquid form or sublimate to form a vapor.

In some embodiments of the invention, the liquid is water, preferably deionized water, and the vessel is only partly filled with water so that a substantial headspace is present in the vessel. In such an embodiment, when the resulting ice is subsequently warmed to a temperature above its melting point, a highly concentrated water vapor forms in the headspace as a result of the low (i.e., below atmospheric) pressure in the vessel. Other embodiments of the present invention provide a vessel containing a highly-purified, high concentration water vapor for use in microelectronics or semiconductor applications, such as ion implantation.

A first aspect of the invention provides a method for the production of a purified liquid for use in a microelectronics manufacturing process, comprising the steps of adding a liquid to a vessel, cooling the liquid to a temperature less than about a freezing point of the liquid, applying a vacuum to the interior of the vessel to substantially remove gaseous contents of the vessel, and warming the liquid to a temperature greater than about the freezing point of the liquid to produce the purified liquid.

A second aspect of the invention provides a method for the production of a purified vapor for use in a microelectronics manufacturing process, comprising the steps of adding a liquid to a vessel, leaving a headspace in the vessel, applying a vacuum to the interior of the vessel to substantially remove gaseous contents of the vessel, cooling the liquid to a temperature less than about a freezing point of the liquid, maintaining the interior of the vessel at a reduced pressure less than an atmospheric pressure, and warming the liquid to a temperature greater than about the freezing point of the liquid at the reduced pressure to produce the purified vapor.

A third aspect of the invention provides an apparatus for the production of at least one of a purified liquid and a purified vapor comprising a vessel, a vacuum device operatively coupled to the vessel for reducing a pressure within the vessel to a pressure less than an atmospheric pressure, thereby substantially removing a gaseous content of the vessel, and a cooling device operatively coupled to the vessel for cooling a liquid within the vessel to a temperature less than about a freezing point of the liquid.

A fourth aspect of the invention provides an ion implantation device for the implantation of ions of a purified vapor comprising an ion implantation device and an apparatus for the production of a purified vapor operatively coupled to the ion implantation device, the apparatus comprising a vessel, a vacuum device operatively coupled to the vessel for reducing a pressure within the vessel to a pressure less than an atmospheric pressure, thereby substantially removing a gaseous content of the vessel, and a cooling device operatively coupled to the vessel for cooling a liquid within the vessel to a temperature less than about a freezing point of the liquid.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

Figure 1:
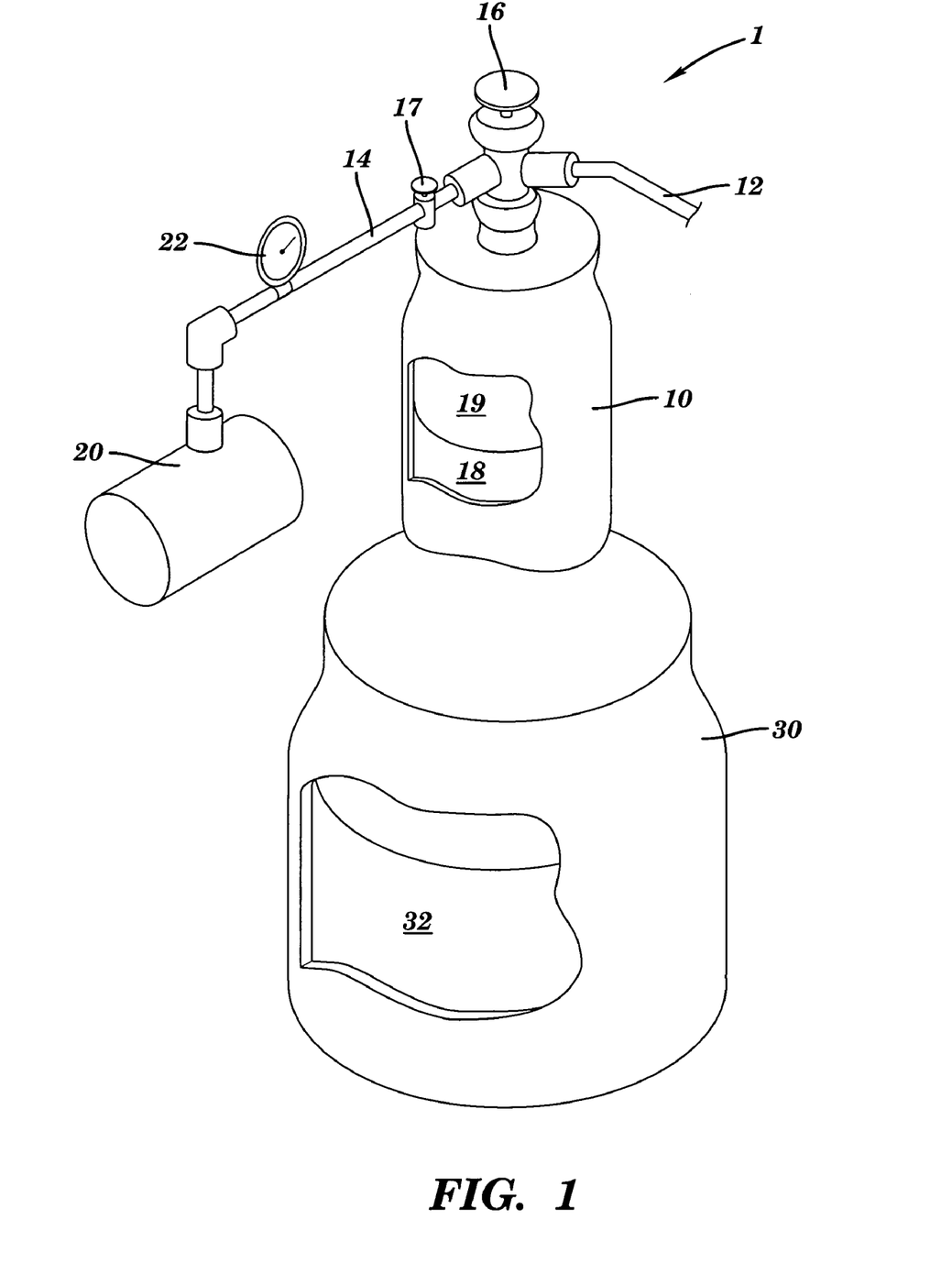
FIG. 1 shows an apparatus according to the invention.

Referring to FIG. 1, the methods of the present invention are carried out in an appropriate apparatus 1 comprising a vessel 10 capable of withstanding extreme pressures/vacuum under various temperatures and having at least one port 12 for adding/removing a liquid 18 and/or for generating a vacuum within the vessel, a cooling device 30 for reducing the temperature within vessel 10 and a vacuum device 20 for creating a vacuum within vessel 10. Those skilled in the art will readily appreciate the various apparatus that may be employed in practicing the present invention.

A vessel 10 suitable for use in the practice of the present invention may be in the form of a closed tank, gas cylinder, or other container. Vessel 10 may be a stand alone vessel or one integrated into a larger system. Vessel 10 should be constructed of a material that is inert to or essentially non-reactive with liquid 18 and its constituents and of sufficient strength and integrity so as to withstand extreme pressures, especially high vacuums under various temperatures, including extreme temperatures. Vessel 10 should have at least one port 12 for the addition/extraction of liquid 18 and/or for drawing a vacuum. Alternatively, vessel 10 may have multiple ports 12, 14 including, for example, a port 12 for the influx and efflux of liquid 18 and a separate port 14 for evacuating the gas from the interior of vessel 10. Where vessel 10 is integrated into a system, it is preferred that vessel 10 have two or more ports 12, 14, and most preferably two or three ports: one for drawing the vacuum and either one for adding and extracting liquid 18 or separate ports for adding and for extracting liquid 18. Integrated into or attached to a port 12, 14 will be one or more valve mechanisms 16 for controlling the influx and efflux of liquid 18 as well as for allowing for the evacuation of the internal atmosphere of vessel 10 and the retention of the vacuum. Finally, cooling or refrigeration devices 30 may also be incorporated/integrated into or associated with vessel 10. For example, vessel 10 may have conduits integrated into its walls that allow for the flow of refrigerant supplied by another device.

The selection of a specific vessel is dependent upon the desired end product of the process and its intended use. For example, vessel 10 could be in the form of a high-pressure gas cylinder which allows for portability and convenience of use and storage. Alternatively, vessel 10 could be a large tank used as a storage vessel from which treated liquid 18 is drawn off when needed. Further, vessel 10 may be in the form of a single or plurality of tanks integrated into a multitask manufacturing/processing system that uses treated liquid 18. Where a plurality of tanks are employed, the tanks could be set up in parallel so that one tank is performing the purification process while the other is discharging treated liquid 18, so that a continuous supply of treated liquid 18 is available for the manufacturing process. In this respect, the discharge of treated liquid 18 may be in the form of a liquid or a concentrated vapor.

Still referring to FIG. 1, a preferred embodiment of the invention is shown comprising a vessel 10, a vacuum device 20, and a cooling device 30. Liquid 18 may be introduced into vessel 10 through a first port 12 in vessel 10. Vacuum source 20 applies vacuum pressure to the contents of vessel 10 via its attachment to a second port 14 in vessel 10. In other embodiments, liquid 18 may be introduced into vessel 10 and the vacuum source attached to vessel 10 through a single port. A pressure gauge 22 is helpful in ensuring adequate vacuum pressure is applied to the contents of vessel 10. In some embodiments where it is desirable to maintain a reduced pressure within vessel 10 after the vacuum pressure from vacuum source 20 has been discontinued, a valve 16 or similar device may be incorporated into vessel 10. Liquid 18 within vessel 10 is cooled via application of a cooling device 30. As depicted, cooling device 30 is a chamber capable of enclosing a portion of vessel 10 and which contains, for example, liquid nitrogen or dry ice 32. Other cooling devices known in the art may be used and are within the scope of the invention, including, for example, traditional refrigeration coils and hydrogen refrigerators.

Figure 2:
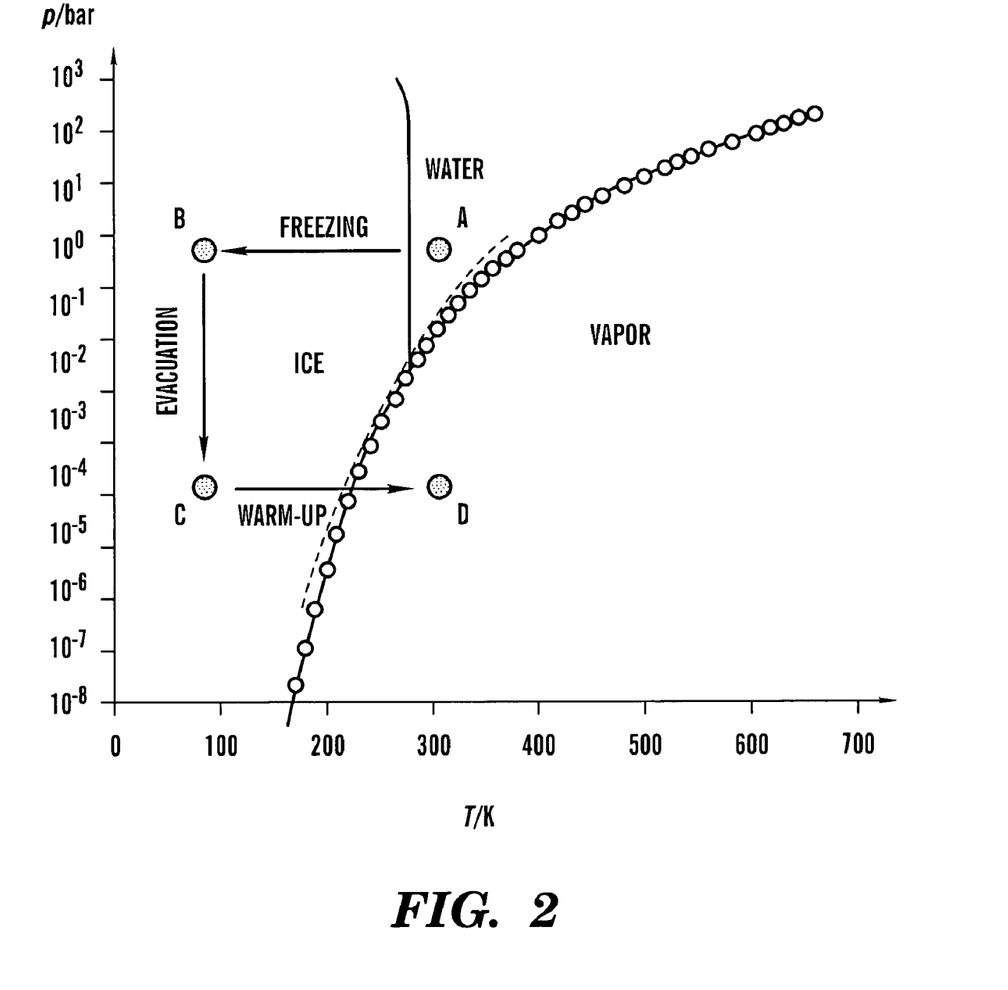
FIG. 2 shows the changes in state of a liquid in one embodiment of the invention.

Referring to FIG. 2, a graphical representation of the changes in state of a liquid (i.e., water) is shown in accordance with one embodiment of a method of the invention. Point A represents the liquid state of the water upon its initial introduction into the vessel. Upon cooling of the water to a temperature below about its freezing point, the water becomes solid (i.e., ice) at point B. Upon reduction of the pressure within the vessel, the water remains in its solid form, shown at point C. Finally, upon maintenance of the reduced pressure but warming of the ice, the water is transformed to water vapor at point D through sublimation.

The methods of the present invention are generally applicable to liquids whose freezing point is substantially above the normal temperature of liquid nitrogen. In a preferred embodiment, the present invention is applicable to liquids whose freezing point is above about $-100°$ C., preferably above about $-50°$ C., and most preferably above about $-10°$ C., at atmospheric pressure. Atmospheric pressure refers to the ambient pressure exerted by the atmosphere in any given location. The practice of the present invention is especially applicable to water.

Referring again to FIG. 1, in accordance with a method of the present invention, liquid 18 is introduced into vessel 10. The amount of liquid 18 to be introduced should be such that a headspace 19 exists in vessel 10 once all of liquid 18 is introduced. Generally speaking, headspace 19 will be on the order of about 5 to 10% of the volume of vessel 10, although larger headspaces are certainly allowable. For example, the headspace may amount to about 30%, and preferably about 20%, of the volume of vessel 10. The volume of headspace 19 should also allow for expansion of liquid 18 upon freezing, especially in the case of water. Alternatively, if the desired final product is a supersaturated vapor of treated liquid 18, headspace 19 should amount to at least about 50%, preferably at least about 60% and most preferably at least about 75% of the volume of vessel 10. Liquid 18 may be at ambient temperature or may be cooled prior to or during its addition to vessel 10.

In accordance with the next step of the method, liquid 18 is cooled to a temperature below about its freezing point. Cooling may be effectuated in a number of ways, depending upon the liquid and the type of vessel used. Where vessel 10 incorporates mechanical cooling devices and/or devices by which a refrigerant is passed through conduits in vessel 10, especially in the vessel walls, cooling may be initiated concurrent with or at any time during the addition of liquid 18. Alternatively, cooling may be initiated following completion of the addition of liquid 18 to vessel 10. Where cooling is to be effectuated by placing vessel 10 in a cooling bath, refrigeration chamber, refrigeration cuff, or the like, cooling is most often, and preferably, initiated following addition of liquid 18 to vessel 10.

The selection of a specific method of cooling is dependent upon a number of factors, including the melting point of liquid 18, the melting point of other constituents in liquid 18, the melting point or condensation point of constituents in headspace 19, the amount of headspace 19, and the vessel 10 used. For most liquids, any number of cooling methods may be used. However, the foregoing factors may influence the timing of the cooling or freezing step. Obviously, the cooling method must achieve a cooling temperature below about the freezing point of the liquid, and preferably substantially below about the freezing point at the pressure within vessel 10. Generally speaking, cooling device 30, whether it be a refrigeration system, bath, or the like, should achieve a cooling temperature at least about 20° C., and most preferably at least about 40° C. below the melting point of liquid 18 at the pressure within vessel 10. Such temperatures allow for rapid cooling so as to avoid the condensation and/or freezing of other constituents, especially gaseous contents, in liquid 18 or headspace 19 that have condensation and/or melting points at or near the melting point of liquid 18. Of course, substantially colder cooling devices, e.g., those having cooling temperatures more than about 100° C. below the melting point of liquid 18, such as liquid nitrogen, may be employed, provided that the cooling time is minimized, again to avoid the condensation and/or freezing of undesired components. For example, air contains low levels of carbon dioxide (about 0.03%) and argon gas (about 0.94%). If a liquid nitrogen bath is used as cooling device 30, particularly where a large headspace 19 is present in vessel 10, the cooling time should be minimized so as to prevent the freezing of the carbon dioxide (melting point about −56.6° C.) and the argon (melting point about −189.2° C.) prior to the vacuum evacuation of gaseous components in vessel 10. Since the amount of these constituents is so low, they may not be of consequence, especially where there is little headspace 19. However, where a large headspace 19 is present in vessel 10, care should be taken to avoid such condensation. Alternatively, this issue can be avoided altogether if a nitrogen gas or other low condensation point, generally inert, gas is used to replace the air in headspace 19 prior to cooling.

Those skilled in the art, having read and understood the present invention, will be able to select the proper cooling device and cooling time for their particular application. For example, with the use of extreme cooling devices, such as liquid nitrogen, sufficient cooling of most liquids, especially water, in a small vessel 10, e.g., a one pound gas cylinder, will be achieved within a matter of minutes, generally less than about five minutes, and preferably less than about three minutes. On the other hand, with much higher temperature cooling devices, such as traditional refrigeration or dry ice baths, the cooling will take considerably longer, on the order of many tens of minutes. Similarly, larger vessels 10 with greater volumes of liquid 18 to be treated, will require longer times to complete the freezing step. Regardless of the cooling time and device, the objective is to obtain complete or substantially complete solidification (freezing) of liquid 18. In this respect, at least about 80% by volume, preferably at least about 90% by volume, and most preferably at least about 95% by volume of liquid 18 is frozen in the cooling step. Incomplete freezing may preclude the ability to remove all or substantially all of the undesired constituents in liquid 18 without prolonged application of the vacuum device, which will also result in loss of liquid 18 due to vacuum drying.

Generally speaking, cooling baths are an easy and cost effective device for cooling liquid 18. Suitable materials for generating the cooling baths are liquid nitrogen and dry ice. As noted above, the proper precautions should be taken when using liquid nitrogen. On the other hand, the aforementioned problems may be avoided by the use of a dry ice bath (melting point about −56.6° C. at 760 Torr), since neither carbon dioxide nor argon gas present in headspace 19 or liquid 18 will freeze with the dry ice bath.

Following the cooling of liquid 18, the interior of vessel 10 is subjected to a vacuum in order to remove gaseous elements from liquid 18 and headspace 19. Any suitable vacuum pump or similar device known in the art may be used to generate the vacuum. Generally, the vacuum is drawn to a pressure of about 200 milliTorr or less, preferably about 100 milliTorr or less, and more preferably about 80 milliTorr or less, and most preferably about 50 milliTorr or less. The vacuum can be initiated immediately following completion of the addition of liquid 18, but is preferably conducted after freezing of liquid 18 has commenced or been completed. Application of the vacuum prior to substantial freezing of liquid 18 will allow for deaeration of liquid 18, thus preventing the entrapment of gas and/or other undesired liquid constituents in liquid 18 upon freezing. However, such application of the vacuum will also allow for some loss of liquid 18 as the pull of the vacuum will cause vacuum drying of liquid 18. Where cooling of liquid 18 is by a device that provides for rapid freezing, e.g., liquid nitrogen, or where the melting points of the constituents to be removed from liquid 18 is above the cooling temperature of the cooling device, it is preferred to commence generation of the vacuum as soon as cooling is initiated to enable removal of those constituents prior to their freezing. Although condensation of these constituents may occur, liquid constituents may be removed by maintaining the vacuum for a longer period of time.

Vessel 10 is maintained under cooling conditions and vacuum for a sufficient period of time to ensure that trapped/dissolved gases are removed. At this point, all or substantially all of liquid 18 will have been converted to its frozen/solid state. Generally speaking, the vacuum will be maintained for some period of time following completion of the cooling step, although if the vacuum has been maintained during much of the cooling step, the vacuum can be terminated concurrent with or immediately following completion of the cooling step. Preferably, the vacuum will be maintained for a few minutes following completion of the cooling step, preferably at least two minutes, and more preferably at least five minutes. A longer period may be required if the gaseous contents have condensed or other undesired liquid constituents remain and vacuum drying is needed to remove the same from the vessel.

Once the treatment of liquid 18 has been completed, i.e., liquid 18 has frozen or is substantially frozen and the atmosphere within vessel 10 has been evacuated for a period of time to ensure the gases and/or undesired liquids have been removed or substantially removed, a valve 16 or similar device for the vacuum is closed and the system is allowed to return to about ambient temperature. Of course, one could maintain the vacuum and low temperatures, but such is not necessary. Liquid 18 will remain in vessel 10, in a low pressure state, until such time as it is desired to use or transfer liquid 18 to another container. If vessel 10 is a small, portable vessel, it may be disconnected from the vacuum and/or cooling system, as appropriate, and stored until use of liquid 18 is needed. Removal of cooling device 30 will generally result in a return of the solid to the liquid state, although a portion of liquid 18 may remain in its frozen or solid state in closed, low pressure vessel 10. If a faster transformation back to the liquid state is desired, the temperature can be increased by use of an appropriate heating device, e.g., heating coil, heating cuff, oven, etc. When use or transfer of the treated liquid 18 is desired, vessel 10 may be connected to a system having a lower pressure than exists within vessel 10 or to a pump to remove liquid 18 from vessel 10. Alternatively, vessel 10 may be returned to atmospheric pressure prior to, concurrent with, or subsequent to the melting of frozen liquid 18. Generally, this is not recommended, as the return of a gaseous atmosphere will enable introduced gases to dissolve into liquid 18. In any event, when it is desired to discharge liquid 18 from vessel 10, one may due so by "pulling" liquid 18 via a pressure gradient whereby the system into which liquid 18 is being discharged has a lower pressure than vessel 10. Alternatively, vessel 10 may be pressurized to force liquid 18 out of the vessel.

Where it is desired to create a saturated vapor of liquid 18, the steps undertaken to create the vapor are essentially the same as set forth above, with the exception that the volume of liquid 18 initially introduced into vessel 18 is less than, preferably substantially less than, the volume of vessel 10 and a low pressure is maintained within vessel 10, although the draw of the vacuum is terminated. As frozen liquid 18 melts, it sublimes, forming a vapor that fills the void of headspace 19. Because of the low pressure, the concentration of the vapor in headspace 19 is substantially higher than would be possible were the interior of the vessel at a standard temperature and pressure. Generation of the vapor causes some loss of vacuum, i.e., increase in pressure, in vessel 10, but the pressure remains well below atmospheric pressure. The saturated vapor may be drawn off with a pump or by introducing the vapor into a system whose pressure is lower than that in vessel 10, thus rendering vessel 10 pressurized as compared to the system.

The present invention is demonstrated by way of the following example. Using the apparatus of FIG. 1, a standard one-pound, high pressure bottle 10 was filled to about 25% of its capacity with deionized water. The main valve 16 and pressure relief valve 17 were then closed. Bottle 10 was connected to a vacuum device 20 rough pump having a pressure gauge 22. Bottle 10, while connected to vacuum device 20 was then lowered, slowly, into a cooling device 30 (a bath of liquid nitrogen at about −195.6° C. contained in a Dewar flask). Bottle 10 was lowered to a point where pressure relief valve 17 was about one inch above the neck of the Dewar flask. The level of liquid nitrogen was such that the portion of bottle 10 containing the deionized water was below the surface of the liquid nitrogen. Bottle 10 remained in the liquid nitrogen for approximately three minutes to ensure complete freezing of the deionized water. With vacuum device 20 operating, main valve 16 was then opened to evacuate all, or substantially all, of the air from bottle 10. The evacuation continued for about four minutes, by which time the pressure in bottle 10 had been reduced to 150 milliTorr. Main valve 16 was then closed and bottle 10 removed from cooling device 30. Vacuum device 20 was shut off and bottle 10 allowed to warm at room temperature for approximately one and one-half hours, generating a low pressure water vapor in bottle 10. Vacuum device 20 was then disconnected from bottle 10.

Figure 3:
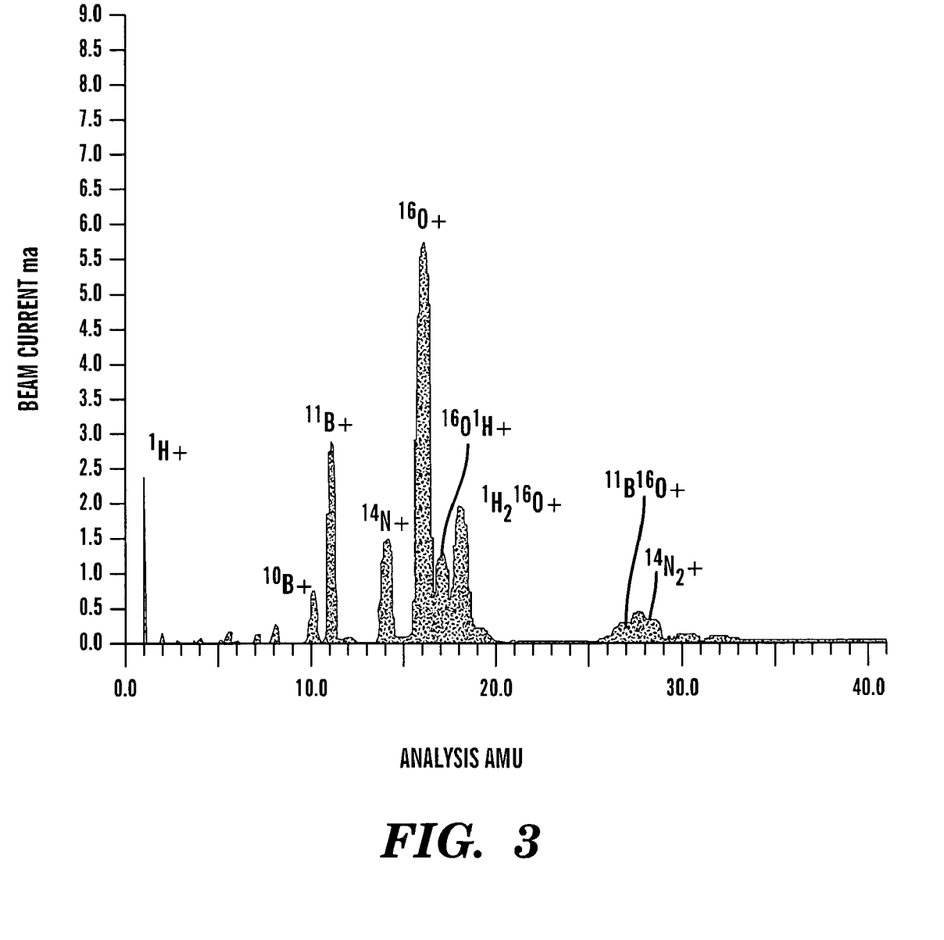
FIG. 3 shows a mass spectra of water vapor purified by one embodiment of the invention.

Bottle 10 was then connected, through port 14, to a VIISta810 ion implanter (not shown). The water vapor was introduced via an SDS port and a mass flow controller. The ion implanter can be operated as a mass spectrophotometer by ionizing the water vapor in an arc chamber, extracting the ions and separating them by means of an analyzing magnet. Referring to FIG. 3, the ion extraction found the following ions:

|  | AMU | | | | | | | | | | |
| --- | --- | --- | --- | --- | --- | --- | --- | --- | --- | --- | --- |
|  | 10 | 11 | 12 | 14 | 15 | 16 | 17 | 18 | 19 | 27 | 28 |
| ION | $B^+$ | $B^+$ | $C^+$ | $N^+$ | $NH^+$ | $O^+$ | $OH^+$ | $H_2O^+$ | $H_3O^+$ | $BO^+$ | $N_2^+$ |

The purified liquids treated in accordance with the practice of the present invention may be used in appropriate manufacturing processes calling for such liquids. In particular, the highly saturated, purified, low pressure vapors produced in accordance with the present invention may be used in those manufacturing processes calling for the use of such vapors. In each instance, the use of such purified liquids and vapors should provide improved performance of the products and/or production rates of such manufacturing processes as undesired constituents are no longer present to adversely affect the processes or the quality of the products of such processes.

More specifically, the water vapors made in accordance with the present invention are particularly suited for use in micoelectronics processing and manufacture. In particular, the vessels containing the water vapor produced in accordance with the present invention may be integrated into or attached to ion implantation equipment for use in various ion implantation processes such as those described above with respect to U.S. Pat. Nos. 5,814,819 and 6,248,642, both of which are hereby incorporated herein by reference.

Figure 4:
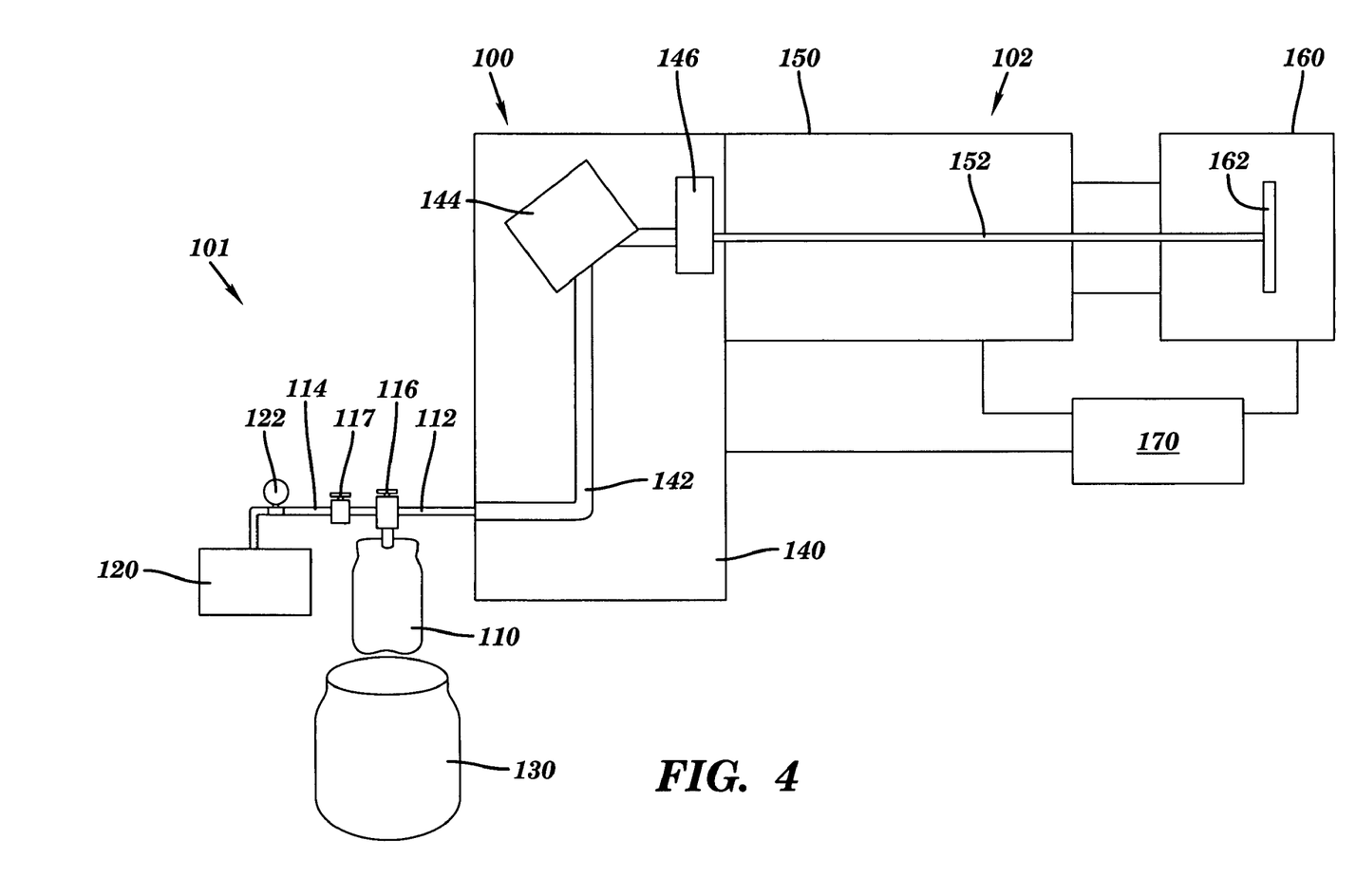
FIG. 4 shows an ion implantation device for the implantation of ions of a purified vapor according to the invention.

For example, referring to FIG. 4, an ion implantation device 100 is shown comprising an ion implanter 102 and an apparatus 101 for producing a purified vapor. Ion implanter 102 may be any such device known in the art. As shown, ion implanter 102 comprises a source 140, a focus line 150, an implant chamber 160, and an implant controller 170. Apparatus 101 provides a purified vapor to source 140 via port 112.

As described above with respect to the apparatus of FIG. 1, a liquid (not shown) is introduced into vessel 110 such that a headspace (not shown) remains in vessel 110. The liquid in vessel 110 is cooled to a temperature below about its freezing point via cooling device 130. Next, the interior of vessel 110 is subjected to a vacuum via vacuum device 120 operatively coupled to vessel 110 by port 114. Closing main valve 116, the reduced pressure within vessel 110 is maintained as the temperature of the liquid within vessel 110 is raised, such that the frozen liquid sublimes to form a purified vapor within vessel 110. As described above, production of the purified vapor may be aided by the inclusion of pressure relief valve 117 and pressure gauge 122.

During operation of ion implantation device 100, purified vapor is drawn from vessel 110 into source 140. Ions of the purified vapor are formed into a rough beam 142. Ion analyzer 144 sorts the ions by any suitable method known in the art, passing some through a high voltage section 146. Focus line 150 then focuses the beam using any suitable method known in the art, to form focused ion beam 152. Ions from focused ion beam 152 then impact, for example, a silicon wafer 162 in implant chamber 160. The position of silicon wafer 162 may be controlled by implant controller 170. Those skilled in the art will readily recognize other suitable applications for the liquids and vapors produced in accordance with the present invention.

The concept of a purified liquid or purified liquid vapor made in accordance with the present invention should not be construed as meaning there are no contaminants or other constituents present in the liquid. Rather, the liquids and vapors produced according to the present invention contain fewer or less concentrated contaminants and/or other constituents as compared to an untreated liquid or vapor. As will be readily recognized by those skilled in the art, the longer the vacuum is drawn on the contents of the vessel, the greater the amount of gaseous and liquid contaminants that will be removed and the purer the resultant liquid. Similarly, liquid contaminants which form azeotropes with the liquid material sought to be purified may not be as readily removed.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method for the production of a purified liquid for use in a microelectronics manufacturing process, comprising the steps of:
    adding a liquid to a vessel;
    cooling the liquid to a temperature less than about a freezing point of the liquid;
    applying a vacuum to the interior of the vessel to substantially remove gaseous contents of the vessel; and
    warming the liquid to a temperature greater than about the freezing point of the liquid to produce the purified liquid, wherein the vacuuming step also removes any unfrozen liquid.

2. The method of claim 1, wherein the vacuuming step is initiated before the cooling step.

3. The method of claim 1, wherein the vacuuming step provides a vacuum of no greater than about 200 milliTorr.

4. The method of claim 1, wherein the adding step includes cooling the liquid.

5. The method of claim 1, wherein the liquid includes water.

6. The method of claim 1, wherein the cooling step reduces the temperature of the liquid to at least about 20° C. below the freezing point of the liquid.

7. The method of claim 6, wherein the cooling step reduces the temperature of the liquid to at least about 40° C. below the freezing point of the liquid.

8. The method of claim 1, further comprising the step of replacing the gaseous contents of the vessel with a gas having a low condensation point.

9. The method of claim 8, wherein the gas includes nitrogen.

10. A method for the production of a purified vapor for use in a microelectronics manufacturing process, comprising the steps of:
    adding a liquid to a vessel, leaving a headspace in the vessel; applying a vacuum to the interior of the vessel to substantially remove gaseous contents of the vessel;
    cooling the liquid to a temperature less than about a freezing point of the liquid;
    maintaining the interior of the vessel at a reduced pressure less than an atmospheric pressure; and
    warming the liquid to a temperature greater than about the freezing point of the liquid at the reduced pressure to produce the purified vapor.

11. The method of claim 10, wherein the headspace is at least about 5% of the volume of the vessel.

12. The method of claim 11, wherein the headspace is at least about 20% of the volume of the vessel.

13. The method of claim 12, wherein the headspace is at least about 60% of the volume of the vessel.

14. The method of claim 13, wherein the headspace is at least about 75% of the volume of the vessel.

15. The method of claim 10, wherein the vacuuming step occurs after the cooling step.

16. The method of claim 10, wherein the vacuuming step provides a vacuum of no greater than about 200 milliTorr.

17. The method of claim 10, wherein the vacuuming step removes any unfrozen liquid.

18. The method of claim 10, wherein the adding step includes cooling the liquid.

19. The method of claim 10, wherein the liquid includes water.

20. The method of claim 10, wherein the cooling step reduces the temperature of the liquid to at least about 20° C. below the freezing point of the liquid.

21. The method of claim 20, wherein the cooling step reduces the temperature of the liquid to at least about 40° C. below the freezing point of the liquid.

22. The method of claim 10, further comprising the step of replacing the gaseous contents of the vessel with a gas having a low condensation point.

23. The method of claim 22, wherein the gas includes nitrogen.

24. An apparatus for the production of at least one of a purified liquid and a purified vapor comprising:
    a vessel;
    a vacuum device operatively coupled to the vessel for reducing a pressure within the vessel to a pressure less than an atmospheric pressure, thereby substantially removing a gaseous content of the vessel;
    a cooling device operatively coupled to the vessel for cooling a liquid within the vessel to a temperature less than about a freezing point of the liquid; and
    a device for adding to the vessel a gas having a low condensation point.

25. The apparatus of claim 24, wherein the vessel has a first port configured to accept a liquid and a second port configured to substantially remove the gaseous content of the vessel.

26. The apparatus of claim 24, wherein the cooling device is at least one selected from a group consisting of liquid nitrogen, dry ice, refrigeration coils, and a hydrogen refrigerator.

27. The apparatus of claim 24, wherein the cooling device is capable of reducing the temperature of the liquid in the vessel to at least about 20° C. below a freezing point of the liquid.

28. The apparatus of claim 27, wherein the cooling device is capable of reducing the temperature of the liquid to at least about 40° C. below the freezing point of the liquid.

29. An ion implantation device for the implantation of ions of a purified vapor comprising:
   an ion implantation device; and
   an apparatus for the production of a purified vapor operatively coupled to the ion implantation device, the apparatus comprising:
      a vessel;
      a vacuum device operatively coupled to the vessel for reducing a pressure within the vessel to a pressure less than an atmospheric pressure, thereby substantially removing a gaseous content of the vessel; and
      a cooling device operatively coupled to the vessel for cooling a liquid within the vessel to a temperature less than about a freezing point of the liquid.

30. The device of claim 29, wherein the cooling device is at least one selected from a group consisting of liquid nitrogen, dry ice, refrigeration coils, and a hydrogen refrigerator.

31. The device of claim 29, wherein the cooling device is capable of reducing the temperature of the liquid in the vessel to at least about 20° C. below a freezing point of the liquid.

32. The device of claim 31, wherein the cooling device is capable of reducing the temperature of the liquid in the vessel to at least about 40° C. below a freezing point of the liquid.

33. The device of claim 29, wherein the apparatus further comprises a device for adding to the vessel a gas having a low condensation point.

\* \* \* \* \*